United States Patent
Shimizu et al.

[11] Patent Number: 6,102,583
[45] Date of Patent: Aug. 15, 2000

[54] METHOD OF ADHESIVE BONDING OPTICAL FIBERS AND OPTICAL FIBER CORD

[75] Inventors: Hidehiko Shimizu; Masanori Nonomura; Satoshi Takehana, all of Nagano, Japan

[73] Assignee: Totoku Electric Co., Ltd., Tokyo, Japan

[21] Appl. No.: 09/207,904

[22] Filed: Nov. 6, 1998

[30] Foreign Application Priority Data

May 8, 1998 [JP] Japan .................................. 10-125628

[51] Int. Cl.⁷ ...................................................... G02B 6/36
[52] U.S. Cl. ............................................. 385/80; 385/78
[58] Field of Search .............................. 385/80–88, 27, 385/31, 39, 51, 52, 144, 78

[56] References Cited

U.S. PATENT DOCUMENTS 5,858,161  1/1999  Nakajima et al. ................. 385/80 X
5,913,001  1/1999  Nakajima et al. ................. 385/80

*Primary Examiner*—Phan T. H. Palmer
*Attorney, Agent, or Firm*—Jordan and Hamburg LLP

[57] ABSTRACT

To avoid change in the property of an optical fiber, an optical fiber cord 100 has a structure fabricated by exposing a portion of the optical fiber 1 located at one end of an optical fiber core 15 which comprises a cushion layer 2 provided over the outer side of the optical fiber 1 and a cladding 3 provided over the outer side of the cushion layer 2; protecting one end of the exposed portion of the optical fiber 1 adjacent to the end of the cushion layer 3 with a roll of low hardness resin 4; and bonding the exposed portion of the optical fiber 1 to the capillary 32 of a ferrule 30 by an adhesive 20 so that the one end of the optical fiber core 15 is fixed integral with the ferrule 30. The stress of thermal shrinkage of the adhesive 20 is attenuated by the action of the low hardness resin 4 thus hardly acting on the optical fiber 1. Accordingly, a change in the property of the optical fiber 1 such as mode shift can be avoided.

2 Claims, 3 Drawing Sheets

METHOD OF ADHESIVE BONDING OPTICAL FIBERS AND OPTICAL FIBER CORD

BACKGROUND OF THE INVENTION

1. Technical Field of the Invention

The present invention relates to a method of adhesive bonding optical fibers and optical fiber cord and more particularly, to a method of adhesive bonding optical fibers in which a change in the property of the optical fiber which is caused by a stress of cure shrinkage of an adhesive applied for bonding the optical fiber to a ferrule or the like can be avoided and an optical fiber cord of the same.

2. Description of the Prior Art

FIG. 6 is a cross sectional view showing a conventional optical fiber cord.

The optical fiber cord 600 has a ferrule 30 bonded by an adhesive 20 to the end of an optical fiber core 15.

The optical fiber core 15 comprises an optical fiber 1, a cushion layer 2 of silicon resin or acrylic resin provided over the outer side of the optical fiber 1, and a cladding 3 of nylon or polyester provided on the outer side of the cushion layer 2. Portions of the cushion layer 2 and the cladding 3 at the end of the optical fiber core 15 are removed to expose the optical fiber 1.

The adhesive 20 is an epoxy resin material.

The ferrule 30 comprises a holder 31 made of stainless steel and a capillary 32 made of zirconia.

The exposed portion of the optical fiber 1 at the end of the optical fiber 15 is directly bonded at its outer side by the adhesive 20 to the inner side of the capillary 32 of the ferrule 30.

FIG. 7 is a flowchart showing steps of fabricating the optical fiber cord 600.

At Step J1, the end of the optical fiber 1 is exposed by removing the portions of the cushion layer 2 and the cladding 3 of the optical fiber core 15.

At Step J2, the optical fiber core 15 is inserted into the hollow in the holder 31 of the ferrule 30. Then, the exposed portion of the optical fiber 1 is inserted into the hollow of the capillary 32 of the ferrule 30 and bonded at its outer side by the adhesive 20 to the inner side of the capillary 32. Accordingly, the end of the optical fiber core 15 is arranged integral with the ferrule 30 hence constituting the optical fiber cord 600.

At Step J3, the end surface of the optical fiber cord 600 is polished so that light can run into and out from the end of the optical fiber 1.

When the optical fiber cord 600 employs a single-mode optical fiber core as the optical fiber core 15, a portion of single-mode light introduced to the other end of the optical fiber cord 600 may be mode shifted thus producing an interference mode which results in decrease of the optical coupling efficiency.

It was found through the perpetual studies of the inventors of this invention that the mode shift was caused by a force of stress resulting from the thermal shrinkage of the adhesive 20 used for bonding the end of the optical fiber core 15 to the ferrule 30.

SUMMARY OF THE INVENTION

It is thus an object of the present invention to provide a method of adhesive bonding optical fibers and an optical fiber cord in which a change in the property of the optical fiber resulting from a stress of thermal shrinkage of the adhesive is avoided.

As a first feature of the present invention, a method of adhesive bonding optical fibers is provided comprising the steps of: removing one end of a cushion layer of an optical fiber element, which is provided over the outer side of an optical fiber, to expose a portion of the optical fiber; protecting one end of the exposed portion of the optical fiber adjacent to the end of the cushion layer with a roll of low hardness resin which has smaller than 30 of a Shore A hardness; and bonding the exposed portion of the optical fiber to a fitting member by a high hardness resin adhesive which has greater than 80 of a Shore D hardness.

In the method, the low hardness resin having a Shore A hardness of smaller than 30 may be silicon resin, elastomer, urethane resin, or the like.

In the method, the high hardness resin having a Shore D hardness of greater than 80 may be epoxy resin, polyimide resin, or the like.

The method of adhesive bonding optical fibers according to the first feature of the present invention allows the exposed portion of the optical fiber to be protected with the roll of the low hardness resin at the end of the cushion layer and then bonded by the adhesive to the fitting member (e.g. the capillary of a ferrule). As the result, the stress of thermal shrinkage of the adhesive is attenuated by the action of the low hardness resin thus hardly acting on the optical fiber. Accordingly, a change in the property of the optical fiber such as the mode shift will be avoided.

As a second feature of the present invention, an optical fiber cord is provided which is characterized by: removing one end of a cushion layer of an optical fiber element, which is provided over the outer side of an optical fiber, to expose a portion of the optical fiber; protecting one end of the exposed portion of the optical fiber adjacent to the end of the cushion layer with a roll of low hardness resin which has smaller than 30 of a Shore A hardness; and bonding the exposed portion of the optical fiber to the capillary of a ferrule by a high hardness resin adhesive which has greater than 80 of a Shore D hardness so that the optical fiber element becomes integral with the ferrule.

The exposed portion of the optical fiber in the optical fiber cord of the second feature is protected with the roll of the low hardness resin at the end of the cushion layer and then bonded by the adhesive to the fitting member (namely, the capillary of the ferrule). This permits the stress of thermal shrinkage of the adhesive to be attenuated by the action of the low hardness resin thus hardly acting on the optical fiber. Accordingly, a change in the property of the optical fiber such as the mode shift will be avoided.

DETAILED DESCRIPTION OF PREFERRED EMBODIMENTS

An embodiment of the present invention will be described referring to the accompanying drawings. The present invention is not limited to the embodiment.

Figure 1:
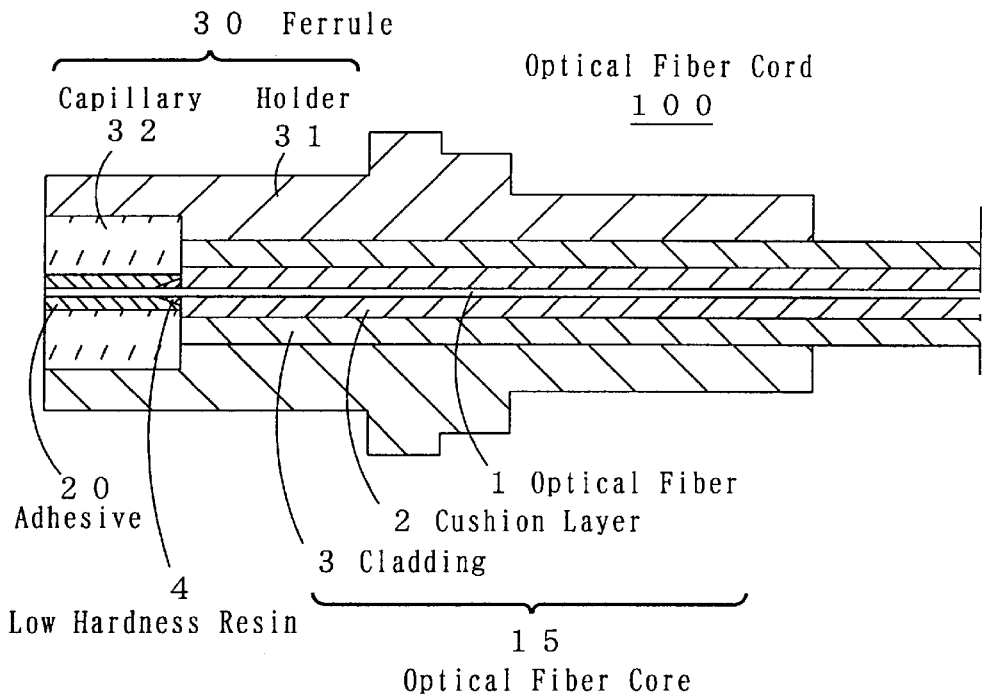
FIG. 1 is a cross sectional view of an optical fiber cord according to an embodiment of the present invention.

FIG. 1 is a cross sectional view of an optical fiber cord according to the embodiment of the present invention.

The optical fiber cord 100 has a ferrule 30 adhesive bonded by an adhesive 20 to one end of an optical fiber core 15.

The optical fiber core 15 comprises an optical fiber 1, a cushion layer 2 of a silicon resin or an acrylic resin provided over the outer side of the optical fiber 1, and a cladding 3 of a nylon material provided over the outer side of the cushion layer 2. The optical fiber 1 is exposed at one end of the optical fiber core 15 by removing the cushion layer 2 and the cladding 3.

The exposed end of the optical fiber 1 adjacent to the end surface of the cushion layer 2 is protected with a roll of low hardness resin 4 which has a Shore A hardness of smaller than 30 and then, adhesive bonded to a capillary 32 of the ferrule 30 by a high hardness adhesive 20 which has a Shore D hardness of greater than 80.

The outer diameter of the optical fiber 1 may preferably be 125 micrometers. The thickness of the cushion layer 2 may range between 60 and 140 micrometers. The thickness of the cladding 3 may be from 300 to 600 micrometers.

The low hardness resin 4 may be a silicon resin material (OF-182, a trade name of Shin-etsu Chemical Industries, Shore A hardness 25, Young's modulus 0.07 kgf/mm$^2$).

The adhesive 20 may be an epoxy resin material (353ND, a trade name of Epoxy Technology, Shore D hardness 87, Young's modulus 630 kgf/mm$^2$).

The ferrule 30 comprises a holder 31 made of stainless steel and the capillary 32 made of zirconia.

Figure 2:
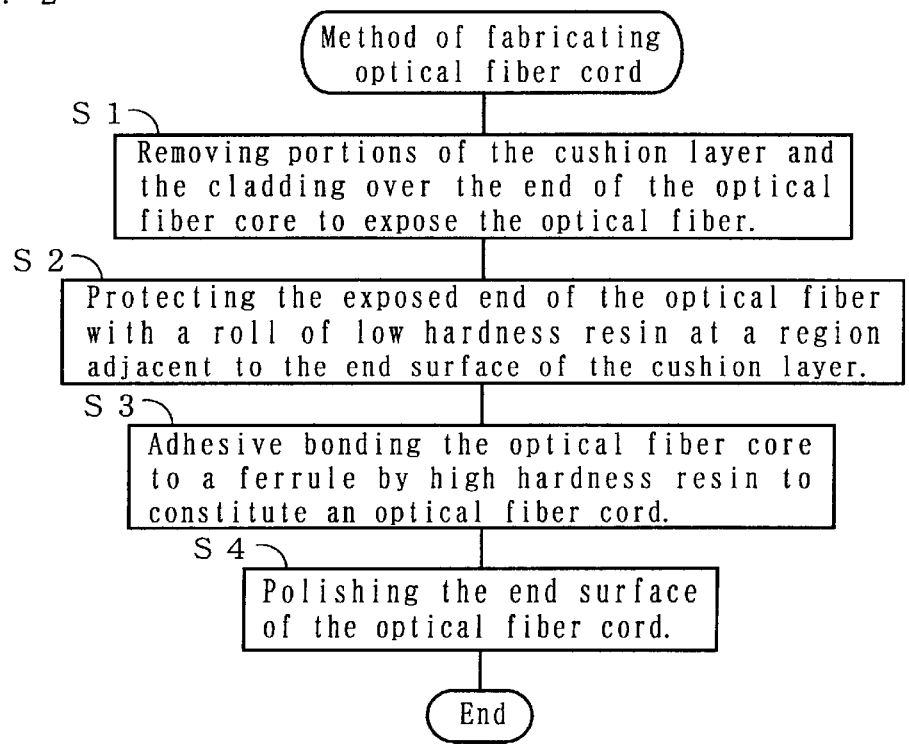
FIG. 2 is a flowchart showing steps of fabricating the optical fiber cord illustrated in FIG. 1.

FIG. 2 is a flowchart showing steps of fabricating the optical fiber cord 100.

Figure 3:
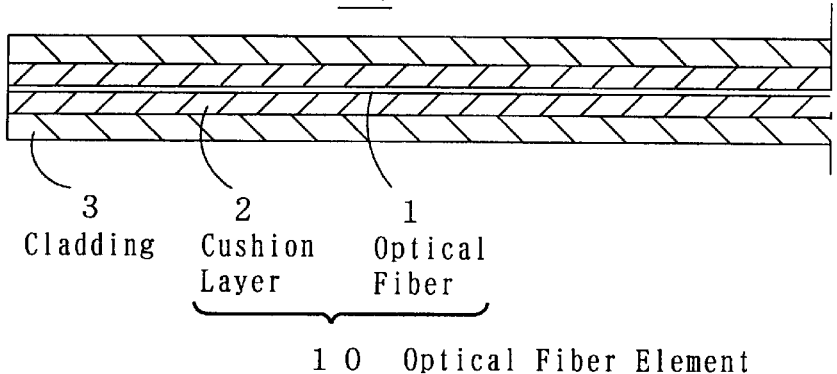
FIG. 3 is a cross sectional view of an optical fiber core.
Figure 4:
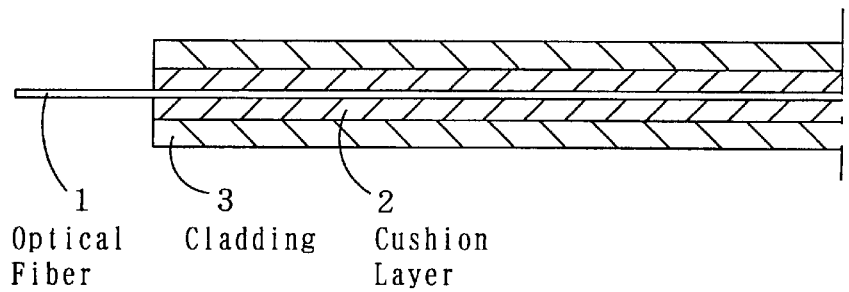
FIG. 4 is a cross sectional view of the optical fiber core with an optical fiber exposed at one end.

At Step S1, portions of the cushion layer 2 and the cladding 3 over the end of the optical fiber core 15, shown in FIG. 3, are removed to expose the optical fiber 1 as shown in FIG. 4. The optical fiber 1 and the cushion layer 2 constitute an optical fiber element 10.

Figure 5:
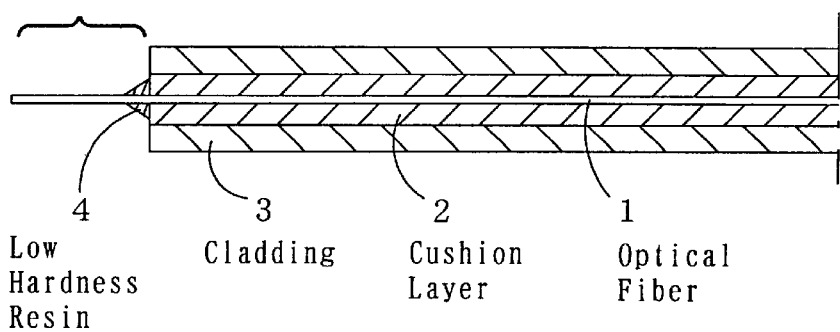
FIG. 5 is a cross sectional view of the optical fiber core where the end of a cladding about the exposed end of the optical fiber is protected with a roll of low hardness resin.

At Step S2, the exposed end of the optical fiber 1 is protected with a roll of the low hardness resin 4 at a region adjacent to the end surface of the cushion layer 2 as shown in FIG. 5.

At Step S3, the optical fiber core 15 is inserted into the hollow of the holder 31 of the ferrule 30 and then, the exposed end of the optical fiber 1 is inserted into the hollow of the capillary 32 of the ferrule 30. The exposed end of the optical fiber 1 is bonded by the adhesive 20 to the inner side of the capillary 32 and accordingly, the optical fiber core 15 is joined at one end integral with the ferrule 30 to complete the optical fiber cord 100.

At Step S4, the end surface of the optical fiber cord 100 is polished so that light can run into and out from the end of the optical fiber 1.

In the optical fiber cord 100, the low hardness resin 4 acts to attenuate the stress of thermal shrinkage of the adhesive 20, hence avoiding the possibility of mode shift.

The optical fiber cord 100 is desirable for use with an optical connector, such as an optical isolator, which is critical to minimize loss derived from the mode shift. In addition, it is suited for use as a unipolar fiber cable which may go with optical circuit components variable in the characteristics depending on the condition of wave surface.

EXAMPLE 1

Using a single-mode optical fiber core 15 of 1.3 micrometers in wavelength, 119 pieces of optical fiber cords 100 were fabricated such as shown in FIG. 1.

The optical fiber cords 100 were examined whether or not their near-field patterns were of Gaussian shape (cf. if the pattern was not of Gaussian shape, its mode had been shifted). Sixty-six of the optical fiber cords 100 had a Gaussian pattern while 53 of them did not. The rate of non-defectiveness was 55%.

(Comparison)

Figure 6:
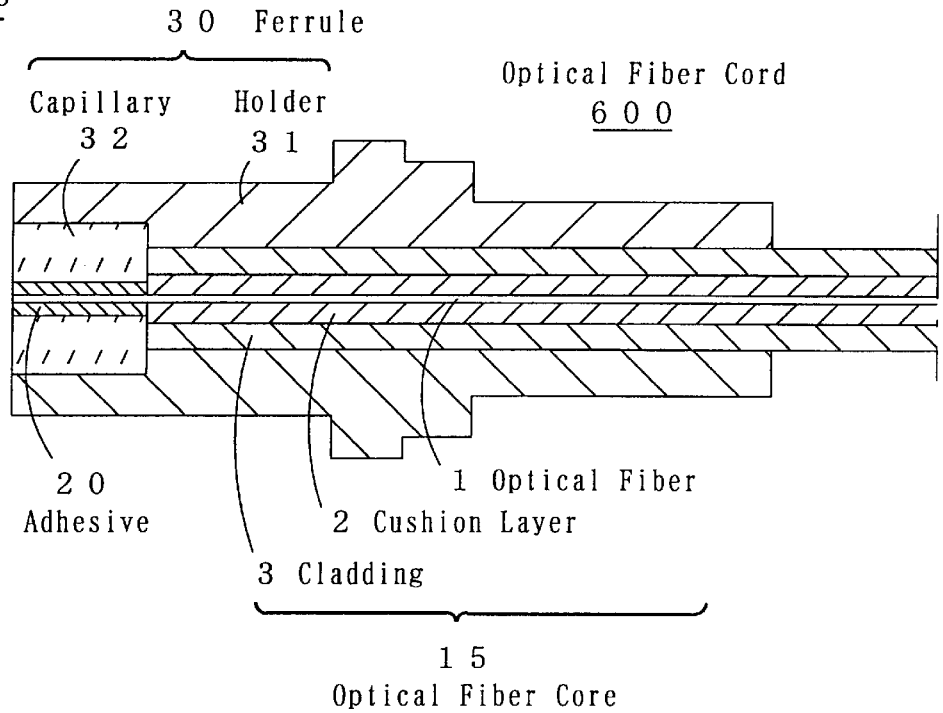
FIG. 6 is a cross sectional view showing a conventional optical fiber cord.
Figure 7:
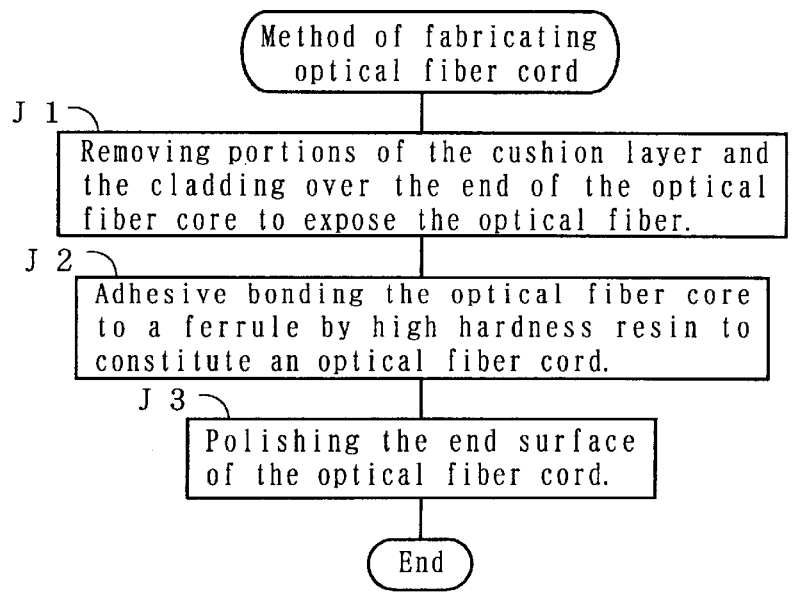
FIG. 7 is a flowchart showing steps of fabricating the optical fiber cord illustrated in FIG. 6.

Using a single-mode optical fiber core 15 of 1.3 micrometers in wavelength, 100 pieces of optical fiber cords 600 were fabricated such as shown in FIG. 6 which included no low hardness resin.

The optical fiber cords 600 were examined whether or not their near-field patterns were of Gaussian shape. As a result, 15 of the optical fiber cords 600 had a Gaussian pattern while 85 of them did not. The rate of non-defective was as low as 15%.

According to the method of adhesive bonding optical fibers, the optical fibers can securely be bonded to a fitting member without producing a change in the property of the optical fiber such as mode shift.

In addition, the optical fiber cord of the present invention provides higher optical fiber properties because such a change in the optical fiber property as the mode shift is avoided.

What is claimed is:

1. A method of adhesive bonding optical fibers comprising the steps of:

removing one end of a cushion layer of an optical fiber element, which is provided over the outer side of an optical fiber, to expose a portion of the optical fiber;

protecting one end of the exposed portion of the optical fiber adjacent to the end of the cushion layer with a roll of low hardness resin which has smaller than 30 of a Shore A hardness; and bonding the exposed portion of the optical fiber to a fitting member by a high hardness resin adhesive which has greater than 80 of a Shore D hardness.

2. An optical fiber cord characterized by:

removing one end of a cushion layer of an optical fiber element, which is provided over the outer side of an optical fiber, to expose a portion of the optical fiber;

protecting one end of the exposed portion of the optical fiber adjacent to the end of the cushion layer with a roll of low hardness resin which has smaller than 30 of a Shore A hardness; and bonding the exposed portion of the optical fiber to the capillary of a ferrule by a high hardness resin adhesive which has greater than 80 of a Shore D hardness so that the optical fiber element becomes integral with the ferrule.

* * * * *